Figure 1:
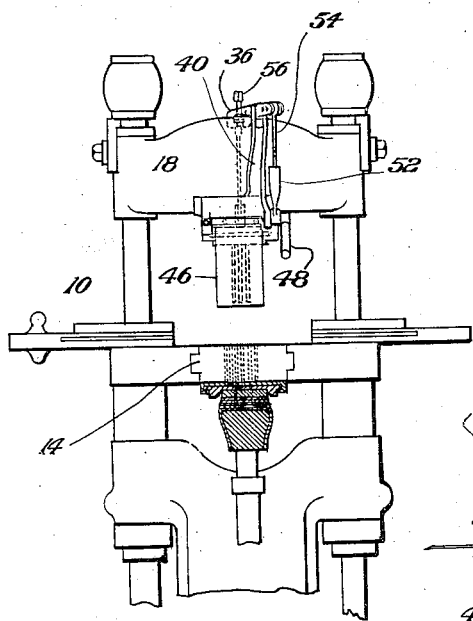

March 25, 1924.

J. H. POPE 1,487,757

NAILING MACHINE

Filed Jan. 14, 1922

INVENTOR
Joseph H. Pope
By his Attorney
Nelson W. Howard

Patented Mar. 25, 1924.

1,487,757

UNITED STATES PATENT OFFICE.

JOSEPH H. POPE, OF HAMILTON, MASSACHUSETTS, ASSIGNOR TO UNITED SHOE MACHINERY CORPORATION, OF PATERSON, NEW JERSEY, A CORPORATION OF NEW JERSEY.

NAILING MACHINE.

Application filed January 14, 1922. Serial No. 529,248.

*To all whom it may concern:*

Be it known that I, JOSEPH H. POPE, a citizen of the United States, residing at Hamilton, in the county of Essex and State of Massachusetts, have invented certain Improvements in Nailing Machines, of which the following description, in connection with the accompanying drawings, is a specification, like reference characters on the drawings indicating like parts in the several figures.

The present invention relates to machines for driving nails, as those used in the attachment of the heels of shoes.

In certain classes of work performed upon such apparatus, as in the securing of rubber lifts to heels, or in the doing of surface-nailing, it is not practicable to employ the well-known multiple die and co-operating drivers capable of operating upon the nails arranged for all sizes of shoes to be heeled for a case of such shoes, since the ends of the unused drivers would deface the tread-surface of the heels. This renders it necessary for the operator to change the nail-engaging means, as the die and driver-plate, for each nailing arrangement, of which there are ordinarily three in each case. The driver-plate of a popular type of machine, the Lightning heeler, is separably held in place in its ways by a securing or locking member forced into engagement with a recess in the plate by a spring, which spring, to prevent accidental displacement of the locking member, must be rather heavy. When the nailing is so done that the nail-heads are left projecting from the base to receive a top-lift, the nail-engaging elements are but infrequently changed, and this arrangement is unobjectionable. When, however, the shifting of the parts becomes frequent, as in rubber heel work, the grasping and drawing up of the locking member against the spring imposes upon the operator a substantial burden. An object of my invention is to relieve this condition, making slight the effort required to effect the change. This object is attained by a novel connection between the securing member and a readily operable member, which may be a portion of a lever mechanism connected to the securing member, and which is preferably utilized to impart movement to another element, which must be manipulated by the operator. This other element may be the guard, which is commonly placed in front of the drivers to prevent their being thrown from the machine if they are broken. By this expedient, practically no added effort is required on the part of the operator to release the drivers, since the guard must be lifted to give access to them, and in accordance with my invention, this action simultaneously frees the drivers.

Figure 3:
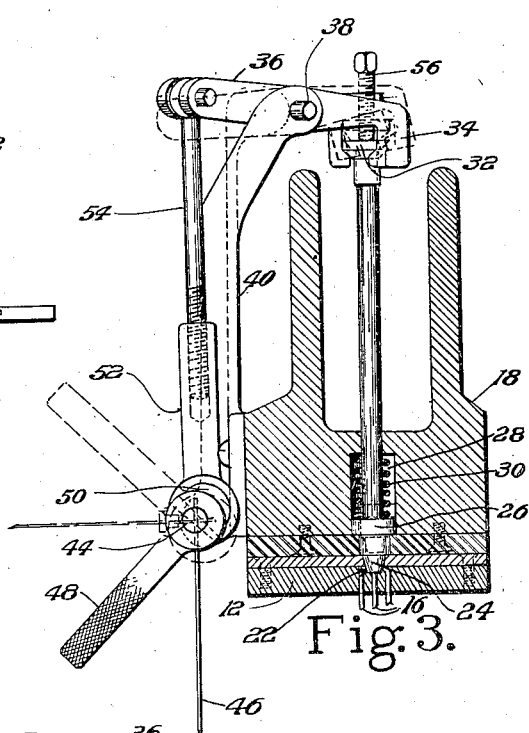
Figure 2:
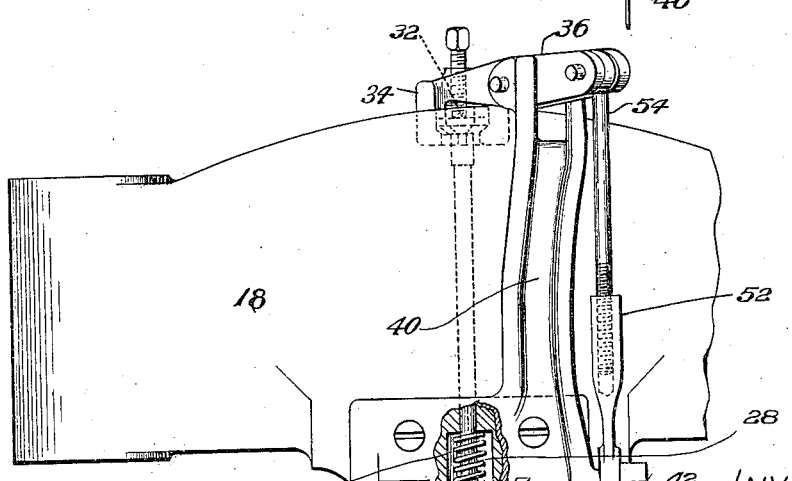

A particular embodiment of the invention applied to a Lightning heeling machine is illustrated in the accompanying drawing, in which Fig. 1 is a partial front elevation of the heeling machine;

Fig. 2, a similar view, on a larger scale, illustrating the elements more particularly concerned in carrying out the present invention; and Fig. 3 is a vertical, transverse section through the top girt of the machine and the driver-plate.

Generally, the machine 10 is as ordinarily arranged for the attachment of rubber heels, and it will only be necessary here to consider the elements associated with the driver-plate 12, which, with the die 14, is to be changed for each nailing design employed. This driver-plate 12, carrying the drivers 16 arranged in the desired relation for the particular heel to be attached, is carried upon the reciprocatory top girt 18 of the machine in ways 20, in which it may be inserted, or from which it may be removed in effecting the change. When the driver-plate is in the nailing position, a recess 22 in its upper face is alined with a locking pin or member 24 arranged to move vertically in the top girt. About this pin, near its plate-engaging extremity, is an enlargement 26 movable in a bore 28 in the top girt, and between this enlargement and the upper end of the bore is a pressure member, furnished by a spring 30, which urges the pin into engagement with the recess 22 to lock the plate. At the upper end of the vertical shank of the pin is fixed a head 32, embraced by the arms of the yoke-portion 34 of a lever 36 fulcrumed at 38 upon a bracket 40 secured to the front of the top girt.

Journaled in bearings 42, 42 in the enlarged lower portion of the bracket is a horizontal spindle 44, slotted longitudinally to receive the edge of a plate 46, which may be of some such transparent material as celluloid. The dimensions of this plate are such that when it is in a vertical position, it will be interposed between all portions of the drivers 16 and the operator or others who may be standing in front of the machine, and thus protect them from flying fragments of broken drivers. To lift the guard-plate to give access to the drivers or restore it to its vertical shielding position, the spindle 44 is provided, near one extremity, with an arm or finger-piece 48, which may conveniently be grasped by the operator to rotate the spindle. Fast upon the spindle, adjacent to the arm 48, is an eccentric 50 surrounded by the strap of an eccentric-rod 52, the upper portion of which is pivoted to the end of the lever 36 opposite the yoke 34.

The position of the locking pin may be used to determine that of the guard-plate. That is, when the enlargement 26 is forced into contact with the bottom of its recess by the spring 30, the plate 46 is preferably held by its eccentric in the shielding position, indicated in full lines in Fig. 3 of the drawings; and when the spring has been compressed in the bore to the maximum amount by lifting of the enlargement 26 to withdraw the pin from the recess 22, the guard-plate may lie in the raised position, shown in dotted lines in Fig. 3. The resistance of the eccentric to rotation is sufficient to hold the guard-plate thus elevated, and the pin raised against the tension of the spring. To permit the guard-plate to stand at the proper angles in its extreme positions—vertically before the drivers when lowered and at least horizontally to clear said drivers when raised—the connections between the pin 24 and the guard-plate may include an adjustment in the length of a portion of the connections, there being, in the present instance, two such adjustments shown. The eccentric-rod 52 has an upper section 54, threaded into the lower. When the upper end of this portion 54 is released at its pivotal connection with the lever 36, it may be rotated to change the effective length of the eccentric-rod, and thus the position of the guard-plate when the locking pin is at its opposite extremes of movement. Between the yoke 34 and the head 32, there naturally exists some lost motion. This may be taken up to the desired extent by a screw 56 threaded through the top of the yoke and contacting with the upper face of the head; or some play may be permitted at this point, which has an effect similar to that of altering the length of the eccentric-rod 52, 54, also changing the extreme positions of the guard-plate.

With my improved organization, when the operator desires to change the driver-plate, he has only to lift the arm 48 from the full-line position of Fig. 3 to that shown in dotted lines. This raises the guard-plate, so that he may reach in to draw out the driver-plate 12, and at the same time withdraws the locking pin 24 from the recess 22, freeing the driver-plate for removal. Not only are these two operations performed simultaneously, but on account of the leverage furnished by the arm 48 and the connections between the guard-spindle and pin, little effort is required to produce the change even against a spring 30 of considerable tension. When a new driver-plate is inserted, the lowering of the arm 48 to its original position locks said driver-plate by permitting the pin to again enter the recess, and also interposes the guard-plate between the drivers and the operator.

Having described my invention, what I claim as new and desire to secure by Letters Patent of the United States is:

1. In a nailing machine, nail-engaging means separable from the machine, movable securing means to prevent such separation of the engaging means, lever mechanism for manipulation by the operator and connected to the securing means, and a guard for the engaging means movable by said lever mechanism.

2. In a nailing machine, nail-engaging means separable from the machine, movable securing means arranged to prevent such separation, pressure means for yieldably holding the securing means in its operating position, and actuating means for manipulation by the operator independently of the movement of separation of the engaging means and connected to the securing means, said actuating means being arranged to temporarily maintain the securing means in position against the action of the pressure means.

3. In a nailing machine, nail-engaging means separable from the machine, movable securing means for the engaging means, a member associated with the engaging means and arranged for movement by the operator, connections between said member and the securing means, and means arranged to vary the effective length of a portion of the connections.

4. In a nailing machine, nail-engaging means separable from the machine, movable securing means for the engaging means, a member associated with the engaging means and arranged for movement by the operator, connections between said member and the securing means, said connections including provision for lost motion, and means arranged to vary the amount of such lost motion.

5. In a heel-attaching machine, a movable carrier member, a driver-plate movable thereon, a locking pin for the plate, a lever fulcrumed upon the carrier member and connected to the pin, connections to the lever arranged for manipulation by the operator, and a driver-guard mounted upon the connections.

6. In a heel-attaching machine, a movable carrier member, a driver-plate separable therefrom, a locking pin for the plate, means for withdrawing the locking pin from the plate, an eccentric rotatable upon the carrier member, an eccentric-rod connected to the withdrawing means, and means arranged to rotate the eccentric.

7. In a heel-attaching machine, a movable carrier member, a driver-plate separable therefrom, a locking pin for the plate, a spring for forcing the pin into engagement with the plate, a lever fulcrumed upon the carrier member and connected to the pin, an eccentric rotatable upon the carrier member, an eccentric-rod connected to the lever, and means arranged to rotate the eccentric.

8. In a nailing machine, nail-engaging means arranged for removal from the machine, means for locking the engaging means in position for operation, movable guard means associated with the engaging means, and a member movable to simultaneously actuate the locking means and guard means.

9. In a nailing machine, movable nail-engaging means, locking means therefor, movable guard means associated with the engaging means, and connections between the locking and guard means, said connections being arranged to lock the engaging means when the guard means is effective.

10. In a nailing machine, movable nail-engaging means, locking means therefor, movable guard means associated with the engaging means, connections between the locking and guard means, a pressure member acting upon one of said means to move it toward one extreme position and through the connections tending to similarly affect the other means, and a device arranged to temporarily maintain said means in position against the action of the pressure member.

11. In a nailing machine, movable nail-engaging means, locking means therefor, movable guard means associated with the engaging means, connections between the locking and guard means, a pressure member acting upon one of said means to move it toward one extreme position and through the connections tending to similarly affect the other means, and a device associated with said other means arranged to temporarily maintain said means in position against the action of the pressure member.

12. In a heel-attaching machine, a movable carrier member, a driver-plate separable therefrom, a locking pin for the plate, a spring for forcing the pin into engagement with the plate, a lever fulcrumed upon the carrier member and connected to the pin, an eccentric rotatable upon the carrier member, and eccentric-rod connected to the lever, means arranged to rotate the eccentric, and means arranged to permit the effective length of a portion of the connections to be varied.

13. In a heel-attaching machine, a movable carrier member, a driver-plate separable therefrom, locking means for the driver-plate, a movable guard for the drivers, and connections between the locking means and guard.

14. In a heel-attaching machine, a movable carrier member, a driver-plate separable therefrom, locking means for the driver-plate, a spindle rotatable upon the carrier, a guard-plate carried by the spindle, an eccentric fixed to the spindle, and connections between the locking means and eccentric.

15. In a heel-attaching machine, a movable carrier member, a driver-plate separable therefrom, a locking pin for engagement with the driver-plate, a spring acting to force the pin into engagement with the driver-plate, a spindle rotatable upon the carrier, a guard-plate carried by the spindle, an eccentric fixed to the spindle, and connections between the pin and eccentric.

In testimony whereof I have signed my name to this specification.

JOSEPH H. POPE.